G. E. DRUM & J. H. SKITT.
MERCERIZING MACHINE.
APPLICATION FILED OCT. 28, 1909.

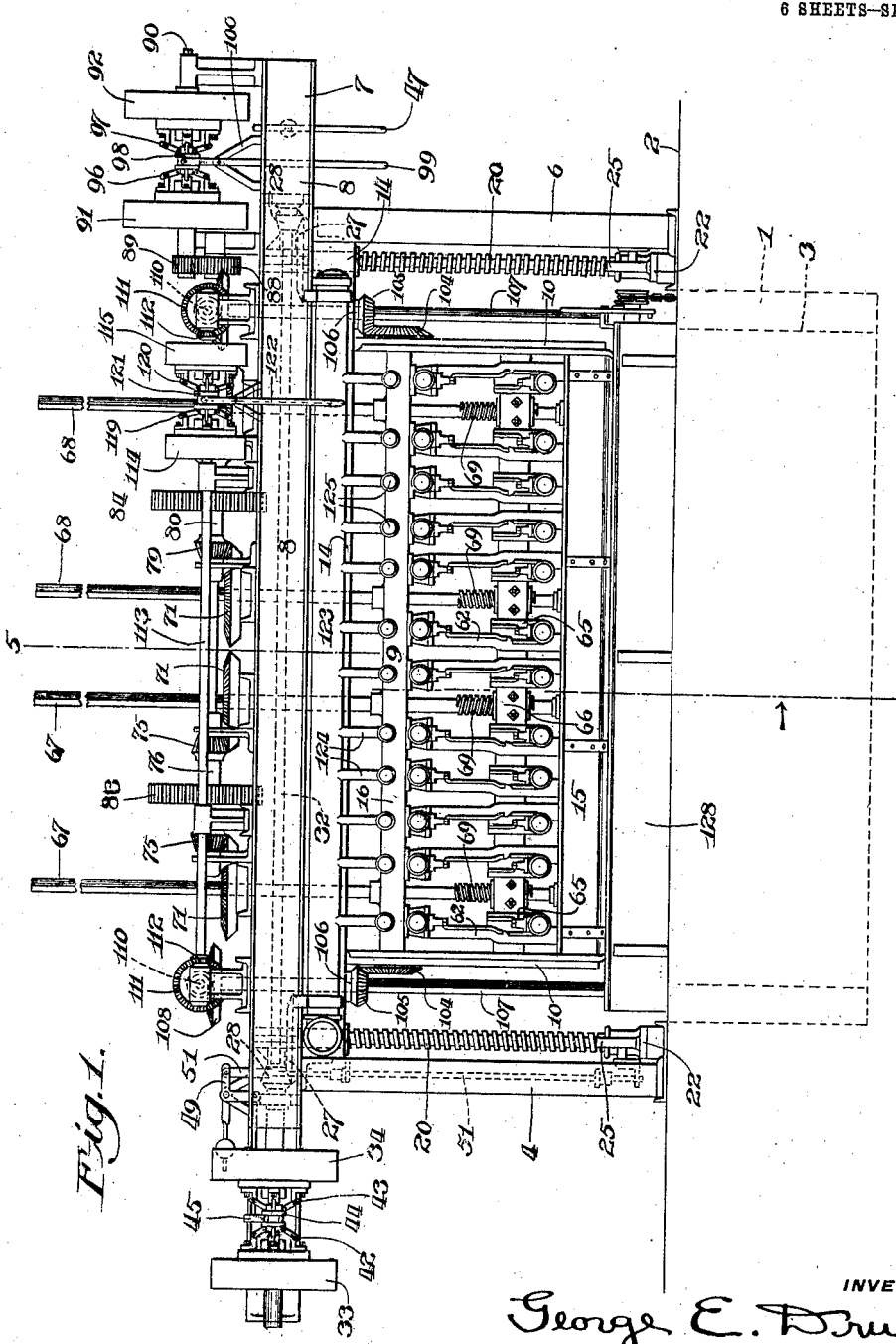

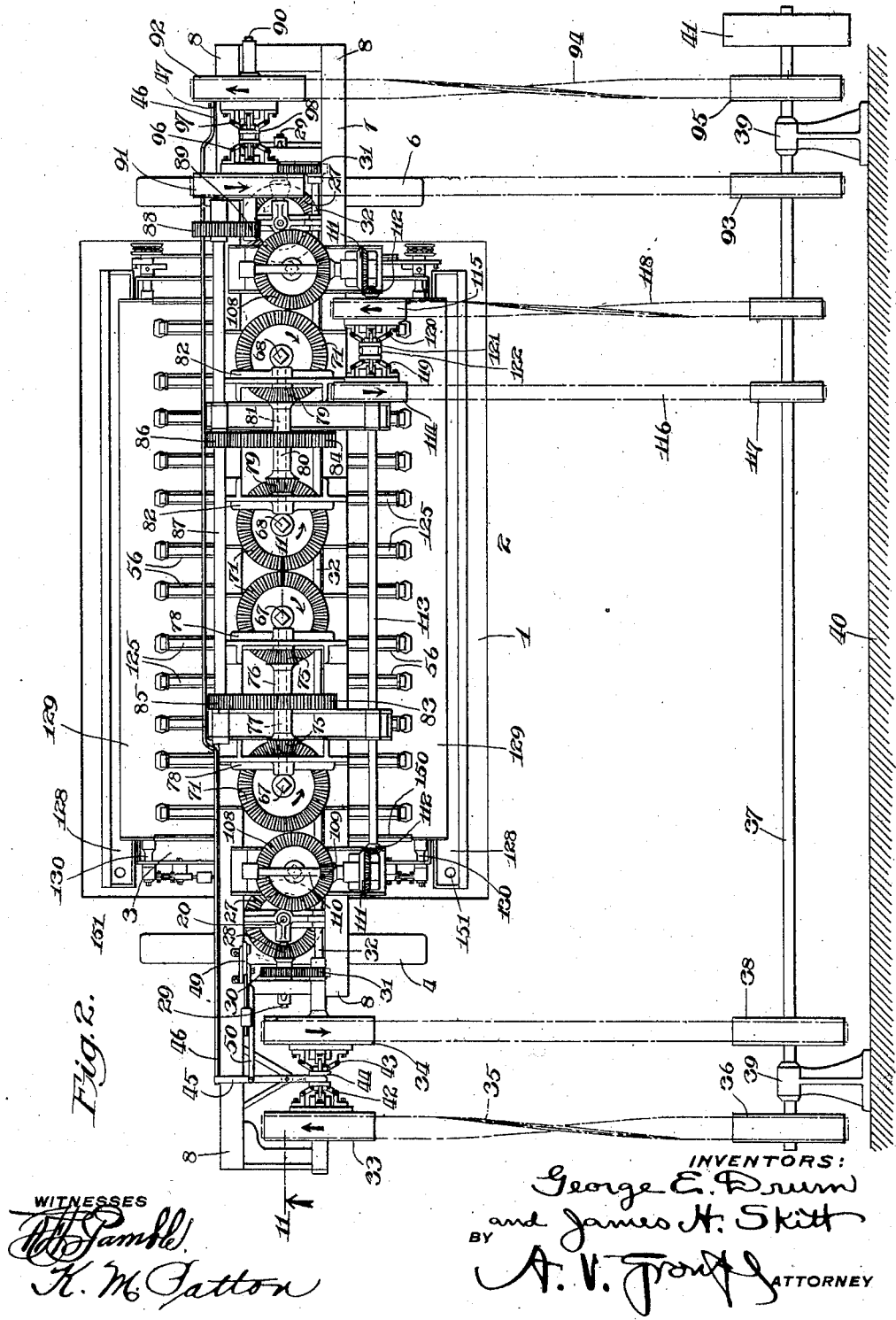

983,543.

Patented Feb. 7, 1911.
6 SHEETS—SHEET 4.

WITNESSES

INVENTORS:
George E. Drum
and James H. Skitt
BY
ATTORNEY

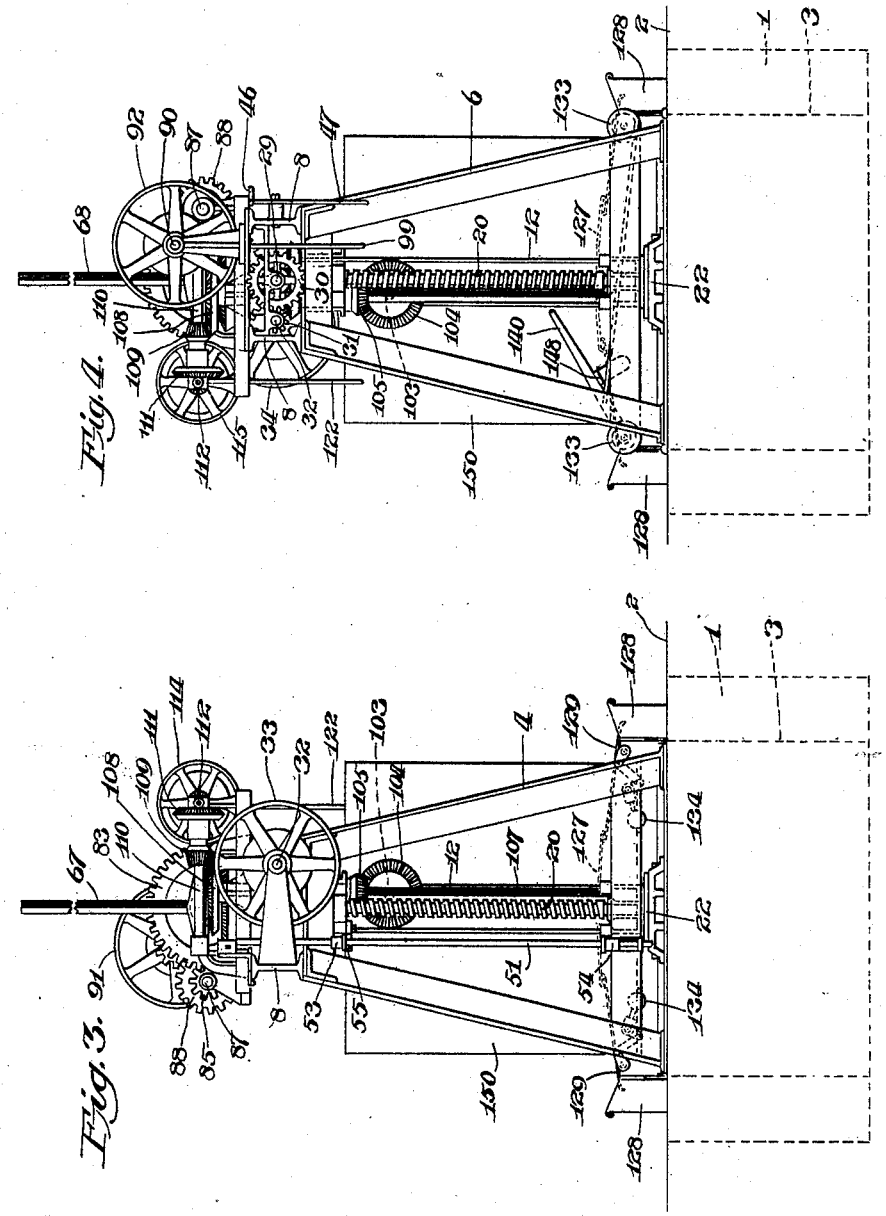

G. E. DRUM & J. H. SKITT.
MERCERIZING MACHINE.
APPLICATION FILED OCT. 28, 1909.
983,543.
Patented Feb. 7, 1911.
6 SHEETS—SHEET 5.
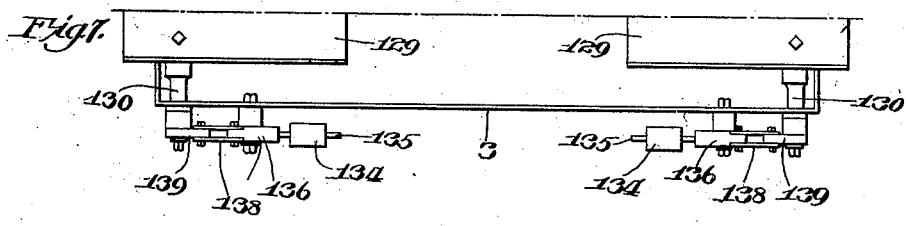
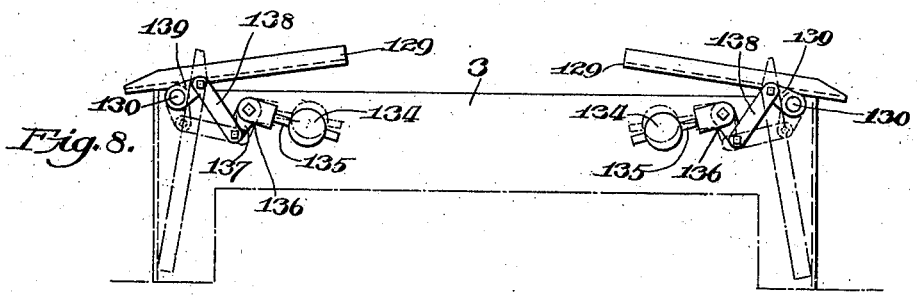
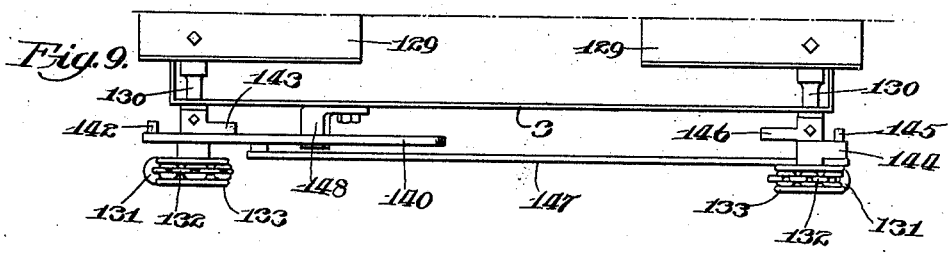
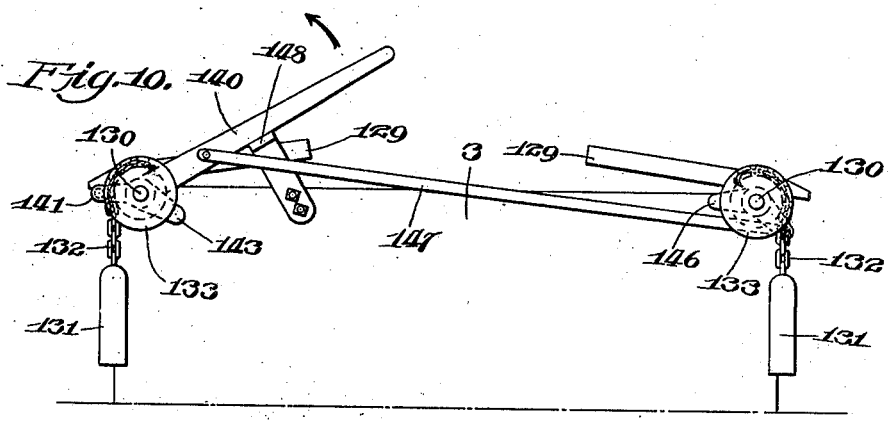
INVENTORS:
George E. Drum
and James H. Skitt
BY A. V. Trout
ATTORNEY
WITNESSES G. E. DRUM & J. H. SKITT.
MERCERIZING MACHINE.
APPLICATION FILED OCT. 28, 1909.
983,543.
Patented Feb. 7, 1911.
6 SHEETS—SHEET 6.
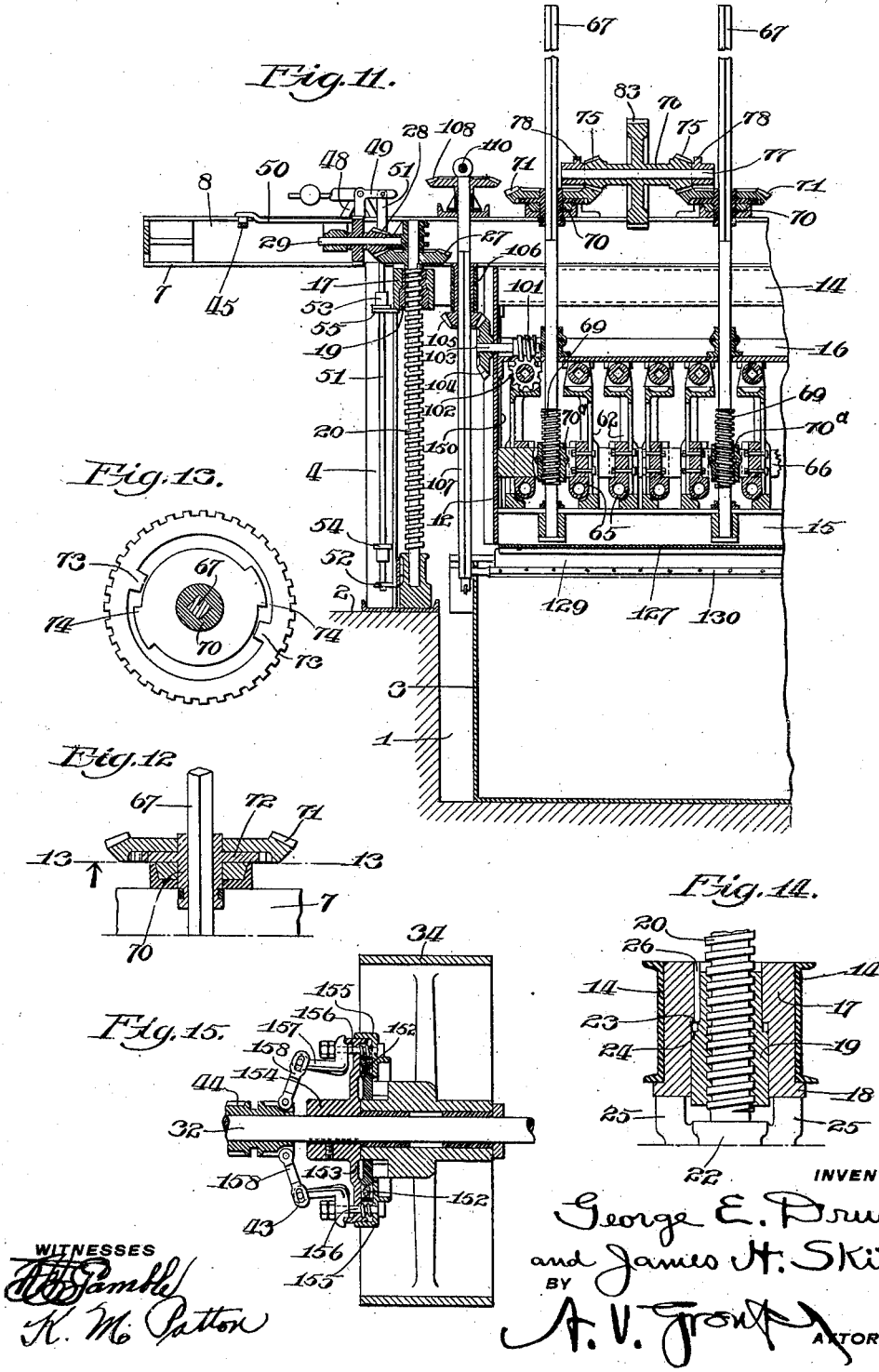

UNITED STATES PATENT OFFICE.

GEORGE E. DRUM AND JAMES H. SKITT, OF PHILADELPHIA, PENNSYLVANIA, ASSIGNORS TO ROBERT P. SMITH AND SAID GEORGE E. DRUM, BOTH OF PHILADELPHIA, PENNSYLVANIA.

MERCERIZING-MACHINE.

983,543.      Specification of Letters Patent.      Patented Feb. 7, 1911.

Application filed October 28, 1909. Serial No. 525,167.

*To all whom it may concern:*

Be it known that we, GEORGE E. DRUM and JAMES H. SKITT, citizens of the United States, residing at Philadelphia, in the county of Philadelphia and State of Pennsylvania, have invented certain new and useful Improvements in Mercerizing-Machines, of which the following is a specification.

The object of our invention is to provide a mercerizing machine of novel, simple and efficient construction having provision whereby the material, yarn for example, may be introduced to a mercerizing liquid, removed therefrom and then subjected to a washing operation to remove the mercerizing liquid from the material being treated, as will be hereinafter fully described and particularly pointed out in the claims.

Reference is made to our co-pending application for a patent for an improvement in mercerizing machines, Serial No. 447,014.

Figure 5:
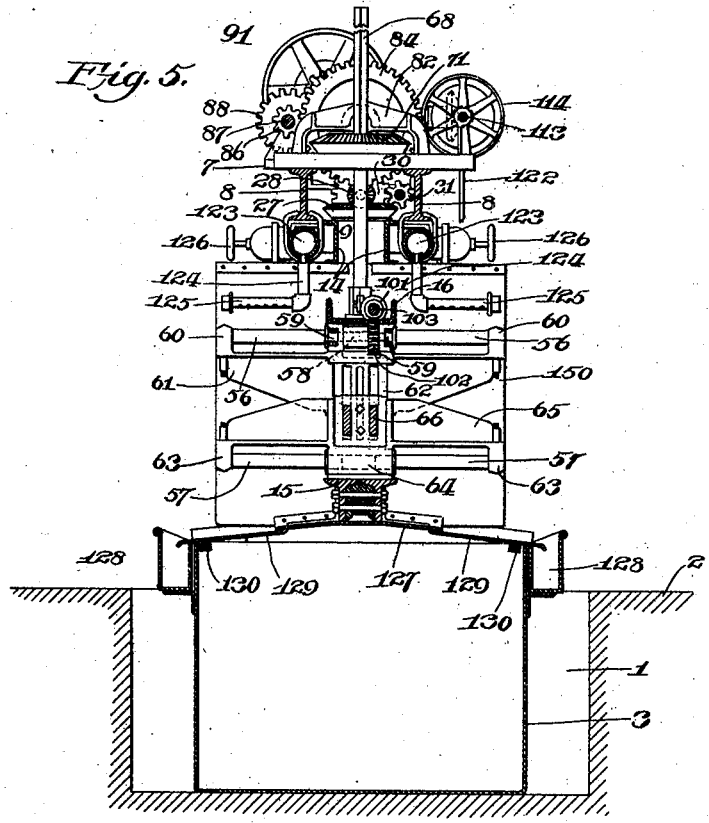
Figure 6:
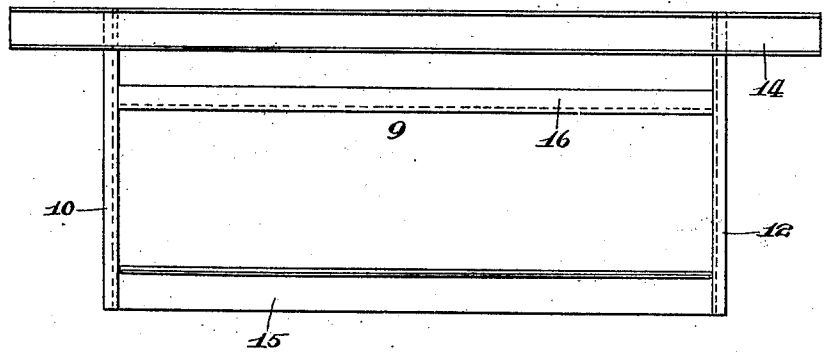

In the drawings:—Figure 1 is a side elevation of our improved mercerizing machine. Fig. 2 is a plan view thereof, including an outside driving shaft and belts for driving certain parts of the machine from said shaft. Fig. 3 is an elevation of the left hand end of the machine. Fig. 4 is an elevation of the right hand end thereof. Fig. 5 is a transverse section through the machine, on line 5—5 of Fig. 1. Fig. 6 is a side elevation of the yarn-carrying frame. Fig. 7 is a plan view of the left hand end of the tank and parts supported thereby. Fig. 8 is an elevation of the parts shown in Fig. 7. Fig. 9 is a plan view of the right hand end of the tank and of parts supported thereby. Fig. 10 is an elevation of the parts shown in Fig. 9. Fig. 11 is a vertical section through the left hand end of the machine, on line 11—11 of Fig. 2. Fig. 12 is a vertical section showing one of the vertical shafts employed in the yarn stretching mechanism, its bevel driving gear and the bearings therefor. Fig. 13 is a section on line 13—13 of Fig. 12. Fig. 14 is a vertical section showing one of the screws for raising and lowering the yarn supporting frame, the adjacent parts of the screw and portion of the lower bearing for the screw. Fig. 15 is a vertical section showing one of the driving pulleys, its shaft and its clutch device.

Arranged within a depression 1 in a suitable flooring 2 is a rectangular tank 3 adapted to contain the mercerizing liquid. Rising from the flooring 2, adjacent the ends of the tank 3, are frames or standards 4 and 6 which support a horizontally-arranged frame 7 comprising two longitudinal I-beams 8 extending between and beyond the standard 4 and 6 and suitable transverse cross bars connecting the I-beams. Between the standards 4 and 6 and between the tank 3 and frame 7 is arranged a vertically-movable, yarn-carrying frame 9, which comprises vertically-arranged end bars 10 and 12 having their upper ends connected by a pair of horizontal channel bars 14 and having their lower ends connected by a horizontal composite bar 15 and having their body portions connected by a horizontal channel bar 16 arranged a slight distance below the channel bars 14, the horizontal bars 14, 15 and 16 being secured to the vertical end bars 10 and 12 and the whole forming a solid frame 9.

The upper channel bars 14 of the frame 9 extend beyond the end bars 10 and 12 thereof and secured to and between the bars 14 at each end thereof is a block 17 provided with a lower flange 18 upon which the bars 14 rest. Each block 17 is provided with a central, vertical opening therein, and fitted to slide vertically within the opening in each block 17 is a block 19 having a vertically-arranged, screw-threaded opening extending therethrough. The screw-threads of the opening in the blocks 19 are fitted to and supported by vertical screw-threaded shafts 20, one shaft 20 being provided with a right-hand screw-thread and the other shaft 20 being provided with a left-hand screw-thread. The shafts 20 have their lower ends journaled in suitable bearings 22 on the bases of the standards 4 and 6, and their upper ends journaled in suitable bearings on the upper frame 7. Each outer block 17 is provided with a shoulder 23 which is adapted to rest upon a shoulder 24 on its inner block 19. It will therefore be seen that the screw-threaded shafts 20 support the blocks 19 and that the blocks 19 support the blocks 17 and therewith the yarn-carrying frame 9. It will also be seen that if the shafts 20 be rotated in opposite directions to each other, and then rotated in reverse opposite directions to each other, the blocks 19 and therewith the yarn-carrying frame 9 may be lowered and raised to lower the frame 9 into the tank 3 from the position shown and to raise the frame 9 from the tank 3 to the position shown. When the yarn-carrying frame 9 is lowered into the tank 3, the blocks 19 supporting the frame 9 come to rest on arms 25 projecting from the bearings 22 thereby permitting the shafts 20 to lower the blocks 19 slightly after the frame 9 has come to rest by lowering the shoulders 24 slightly from the shoulders 23, as shown in Fig. 14, for a purpose described.

A suitable key 26 is provided between each outer block 17 and each inner block 19 to prevent rotation of the inner blocks 19 during the rotation of the shafts 20, and to permit vertical movement of the blocks 19 with respect to the blocks 17.

The upper ends of the screw-threaded shafts 20 are provided with bevel gear wheels 27 in mesh with bevel pinions 28 on oppositely-disposed short-horizontal shafts 29 having their bearings in cross bars of the frame 7. The shafts 29 are provided with gear wheels 30, which co-act with pinions 31 secured to a longitudinally-extending horizontal shaft 32 journaled in suitable bearings on the frame 7. This shaft is provided with two loose pulleys 33 and 34, the pulley 33 being adapted to be driven by a cross belt 35 from a pulley 36, on an outside shaft 37, and the pulley 34 being adapted to be driven by a direct belt from a pulley 38 on the same outside shaft 37. This outside shaft 37 is journaled in suitable bearings 39 on a side wall 40 and the shaft 37 is provided with a pulley 41 by means of which it may be driven. It will thus be seen that the two pulleys 33 and 34 may be driven in reverse directions, as indicated by the arrows in Fig. 2. These pulleys 33 and 34 are provided with suitable clutch devices 42 and 43, respectively, by means of which either of the pulleys 33 or 34 may be clutched to and unclutched from the shaft 32 independently of each other. The clutch devices 42 and 43 may be of any approved type, and they are operated by a centrally disposed grooved collar 44 mounted on the shaft 32.

When the clutch collar 44 is in the central position, as shown in the drawings, the clutch devices 42 and 43 are in the unclutched position and the pulleys 33 and 34 are free to rotate idly upon the shaft 32; when, however, the collar 44 is moved toward the pulley 33, the clutch device 42 is operated to clutch the pulley 33 to the shaft 32 to rotate the shaft in one direction, and when the collar 44 is moved toward the pulley 34, the clutch device 43 is operated to clutch the pulley 34 to the shaft 32 to rotate the shaft in the reverse direction.

The grooved collar 44 is engaged by the forked end of a lever 45, which is fulcrumed on the frame 7. Pivoted to the lever 45 is one end of a rod or bar 46; the other end of which is pivoted to a hand operated lever 47 which is fulcrumed on the frame 7, whereby the lever 45 may be operated by the hand lever 47 to move the collar 44 to operate the clutch devices 42 and 43.

From the construction just described, it will be seen that when the clutch device 42 is operated to clutch the pulley 34 to the shaft 32, the screw-threaded shafts 20 will be turned in opposite directions through the gear wheels 27 and 30 and pinions 28 and 31 to lower the yarn-carrying frame 9 into the tank; and, that when the clutch device 43 is operated to clutch the pulley 33 to the shaft 32, the direction of movement of the screw-threaded shafts 20 will be reversed to raise the yarn-carrying frame 9 from the tank.

When the yarn-carrying frame is in the raised or lowered position with respect to the tank, the collar 44 is in the central position and the pulleys 33 and 34 are rotating freely upon the shafts 32, and when it is desired to change the position of the yarn-carrying frame 9 with respect to the tank 3, the collar 44 is shifted by hand through the hand lever 47 and its connections to operate the clutch devices 42 and 43 to start the yarn-carrying frame 9 either up or down as the case may be; and when the yarn-carrying frame reaches the desired up position, or the desired down position, as the case may be, the clutch collar 44 is moved to the central position between the pulleys 33 and 34 to stop the rotation of the screw-threaded shafts 20 by an automatic mechanism for operating the clutch collar 44, which we shall now describe:—

Fulcrumed to a bracket 48 on the frame 7 is a bell-crank lever 49, one arm of which is connected by a link 50 to the lever 45 for operating the clutch collar 44, and the other arm of which is connected to the upper end of a vertical rod 51, the lower end of which extends through an opening in and is guided by a bracket 52 projecting from the bearing 22 for one of the shafts 20.

The rod 51 is provided with two fixed collars 53 and 54, and extending from the yarn-carrying frame 9 is an arm 55 which embraces the rod 51 between the two collars 53 and 54, and which is longitudinally movable upon the rod 51 when the yarn-carrying frame 9 is raised and lowered.

When the clutch collar 44 is in the central position shown, the screw-threaded shafts 20 are idle, as previously explained, and when the clutch device 43 is operated by hand to clutch the pulley 33 to the shaft 32 to raise the yarn-carrying frame 9, the rod 51 is lowered slightly from the position shown through its lever 49 and link connection 50 to the lever 45; and when the clutch device 42 is operated by hand to clutch the pulley 34 to the shaft 32 to lower the yarn-carrying frame 9, the rod 51 is raised slightly from the position shown through its lever 49 and link connection 50 to the lever 46.

The collars 53 and 54 are so positioned upon the rod 51 with respect to the arm 55 projecting from the yarn-carrying frame 9 that when the yarn-carrying frame 9 reaches its up position, as shown, the arm 55 will engage the collar 53 to raise the rod 51 to cause it, through its connections, to shift the clutch collar 44 to the central position thereby unclutching the pulley 33 from the shaft 32 and stopping the rotation of the screw-threaded shafts 20 and the further upward movement of the yarn-carrying frame 9; and that when the yarn-carrying frame 9 reaches its down position the arm 55 will engage the collar 54 to lower the rod 51 to cause it, through its connections, to shift the clutch collar 44 to the central position thereby unclutching the pulley 34 from the shaft 32 and stopping the rotation of the screw-threaded shafts 20 and the further downward movement of the yarn-carrying frame 9.

When the clutch collar 44 is moved to the central position to stop the upward movement of the yarn-carrying frame 9 the frame will stop the instant the power is removed from the shaft 32, owing to the weight of the frame 9 and parts carried thereby. When, however, the clutch collar 44 is moved to the central position to stop the downward movement of the yarn-carrying frame 9 the screw-threaded shafts 20 will not cease to rotate instantly upon the removal of the power from the shaft 32, due to the weight of the yarn-carrying frame 9 and the momentum acquired by the rotating parts, and it is for this reason that the blocks 17 and 19 hereinbefore described are provided to permit a slight downward movement of the inner blocks 19 by the screw-threaded shafts 20 after the power has been removed from the shaft 32 and the yarn-carrying frame 9 has come to rest upon the arms 25 projecting from the bearings 22.

The yarn-carrying frame 9 is provided with a series of transversely extending yarn supports, each of which is of the following construction:—

56 and 57 are upper and lower yarn-carrying rollers, respectively, around and between which skeins of yarn are adapted to be placed. The upper rollers 56 are fixed to a shaft 58 which is journaled in central bearings 59 and two outer bearings 60, which project upwardly from a frame 61 carried by a standard 62, which extends between and is secured to the bars 15 and 16 of the yarn-carrying frame 9. The lower rollers 57 are carried by a shaft which is journaled in outer bearings 63 and a central bearing 64, which projects downwardly from a frame 65 which is slidingly fitted to the standard 62 of the frame 61 in a manner to be vertically adjustable thereon. The frames 65 are secured to and supported by a pair of parallel bars 66 which extend horizontally and longitudinally through the frames 65 and standards 62, and are vertically adjustable through suitable slots in the standards 62. It will thus be seen that by raising and lowering the bars 66 the frames 65 and the lower rollers 57 of the yarn-supports carried thereby may be raised and lowered with relation to the upper rollers 56 of the yarn-supports to stretch or produce tension upon the yarn extending around and between the rollers 56 and 57 and to relieve such tension as desired.

The raising and lowering of the bars 66 and therewith the rollers 57 are accomplished by two pairs of vertically arranged shafts 67 and 68 with screw-threaded portions 69, which extend through and are engaged with internal screw-threads in bearing blocks 70$^a$ interposed between and secured to the bars 66. The screw-thread of one shaft of each pair 67 and 68 is made right hand and the screw-thread of the other shaft of each pair 67 and 68 is made left hand, whereby when the two shafts of each pair 67 and 68 are rotated in opposite direction to each other, the bars 66 and therewith the rollers 57 may be raised or lowered as desired.

The pairs of shafts 67 and 68 are journaled in suitable bearings in the bars 15 and 16 of the yarn-carrying frame 9, and the upper ends of the shafts of each pair 67 and 68 are made square and extend through square openings in the hubs 70 of bevel gear wheels 71. Each hub 70 of each gear wheel 71 is provided with a flange 72 which rests upon a cross bar of the frame 7, and each gear wheel 71 is rotatably mounted on the flange of its hub 70, as shown in detail in Figs. 12 and 13. Each gear wheel 71 is provided with inwardly projecting teeth 73 which are adapted to engage outwardly projecting teeth 74 on the flange 72 of its hub 70 whereby upon rotation of each gear wheel 71 the teeth 73 will engage the teeth 74 and correspondingly rotate the hub 70 and therewith its shaft, and whereby initial rotation of each wheel 71 in the reverse direction may be made independently of its hub 70 through a half-revolution, for a purpose hereinafter explained.

From the foregoing description it will be seen that when the frame 9 is raised and lowered the pairs of shafts 67 and 68 will slide through the hubs 70 of the gear wheels 71 and that the gear wheels 71 may be actuated to turn the pairs of shafts 67 and 68 in any position of the frame 9.

The bevel gear wheels 71 on the pair of shafts 67 are engaged by oppositely-disposed bevel pinions 75 formed on or secured to a sleeve 76, which is mounted on a shaft 77, the ends of which are supported by bearing brackets 78 on the frame 7; and the bevel gear wheels 71 on the pair of shafts 68 are engaged by oppositely-disposed bevel pinions 79 formed on or secured to a sleeve 80, which is mounted on a shaft 81, the ends of which are supported by bearing brackets 82 on the frame 7. The sleeve 76 of the pinions 75 is provided with a gear wheel 83; and the sleeve 80 of the pinions 79 is provided with a gear wheel 84. The gear wheels 83 and 84 co-act with pinions 85 and 86, respectively, which are carried by a horizontal shaft 87 journaled in suitable bearings on the frame 7. This shaft 87 is provided with a gear wheel 88 which is driven by a pinion 89 on a driving shaft 90 mounted to rotate in suitable bearings on the frame 7. This driving shaft 90 is provided with two loose pulleys 91 and 92, the pulley 91 being adapted to be driven by a direct belt from a pulley 93 on the shaft 37, and the pulley 92 being adapted to be driven by a cross belt 94 from a pulley 95 on the shaft 37. Thus the two pulleys 91 and 92 may be driven in reverse directions, as indicated by the arrows in Fig. 2. These pulleys 91 and 92 are provided with suitable clutch devices 96 and 97, respectively, by means of which either of the pulleys 91 and 92 may be clutched to and unclutched from the shaft 90 independently of each other. The clutch devices 96 and 97 may be of any approved type, and they are operated by a centrally disposed grooved collar 98 mounted on the shaft 90. When the clutch collar 98 is in the central position, as shown in the drawings, the clutch devices 96 and 97 are in the unclutched position and the pulleys 91 and 92 are free to rotate idly upon the shaft 90. When, however, the collar 98 is moved toward the pulley 91, the clutch device 96 is operated to clutch the pulley 91 to the shaft 90 to rotate the shaft in one direction; and when the collar 98 is moved toward the pulley 92, the clutch device 97 is operated to clutch the pulley 92 to the shaft 90 to rotate the shaft in the reverse direction. The grooved collar 98 is engaged by the upper forked end of a hand lever 99 which is fulcrumed on a bracket 100 on the frame 7 whereby the clutch collar 98 may be moved by hand to operate the clutch devices 96 and 97.

From the construction just described, it will be seen that when the hand lever 99 is moved to operate the clutch device 96 to clutch the pulley 91 to the shaft 90, the shaft 87 will be driven through the gear wheels 88 and 89, and that the sleeves 76 and 80 will be turned in one direction by the gear wheels 83, 84, 85 and 86, thereby causing the bevel gear wheel 71 to rotate the shafts of each pair 67 and 68 in the opposite directions indicated by the arrows in Fig. 1, thereby causing the screw-threads 69 of the shafts 67 and 68 to lower the bars 66 and therewith lower the yarn-carrying rollers 57 with respect to the upper rollers 56 and effect a stretching of the skeins of yarn upon the rollers. After the skeins have been stretched and the desired tension has been produced thereon, the hand lever 47 is operated to move the clutch collar 98 to the central position thereby removing the power from the shaft 90 and stopping the rotation of the shafts 67 and 68 and perforce the further downward movement of the bars 66 and the rollers 57 carried thereby. It will also be seen that when it is desired to remove the tension from the skeins of yarn, the hand lever 99 may be moved to operate the clutch device 97 to clutch the pulley 92 to the shaft thereby effecting a reverse movement of the parts operated to produce the tension, after which the hand lever 99 may be operated to move the clutch collar 98 to the central position thereby removing the power from the shaft.

During the stretching of the skeins of yarn, as just described, a great strain is produced upon the parts of the stretching mechanism between the shaft 90 and the screws 69 of the pairs of shafts 67 and 68, springing the intermediate shafts into a twisted condition. It will therefore be seen that after the stretching operation and after the power has been removed from the shaft 90 the teeth 73 of the gear wheels 71 may move from engagement with the teeth 74 of their hubs 70 thereby permitting the parts of the stretching mechanism to spring back into normal condition without liability of such springing back action causing a reverse movement of the pairs of shafts 67 and 68 and the consequent lessening of the tension produced upon the skeins of yarn while the screws 69 hold the bars 66 down and maintain the tension.

The upper yarn-carrying rollers 56 are adapted to be rotated to actuate the skeins of yarn carried by the rollers 56 and 57 and cause said skeins to pass between and around said rollers when the yarn-carrying frame 9 is in the raised position shown and when the yarn-carrying frame is lowered into the tank; and we shall now describe the mechanism for rotating the upper rollers 56 when desired:—

The shafts 58 of the upper rollers 56 of the yarn supports are each provided with a centrally-arranged worm wheel 102 which is in mesh with a worm 101 on a shaft 103 extending longitudinally over the top of the bar 16 and journaled in suitable bearings thereon. The ends of the shaft 103 extend beyond the ends of the bar 16 and are provided with bevel gear wheels 104 which co-act with bevel pinions 105 on hubs which are mounted to rotate in bearing blocks 106 interposed between and secured to the upper bars 14 of the yarn-carrying frame 9. The hubs of the bevel pinions 105 are provided with centrally-arranged square openings through which square shafts 107 extend. The hubs of the pinions 105 are adapted to slide upon the shafts 107 when the yarn-carrying frame 9 is raised and lowered, and the upper portions of the shafts 107 are journaled in suitable bearings in the frame 7.

The upper ends of the shaft 107 are provided with bevel gear wheels 108 in mesh with bevel pinions 109 on short, horizontal, parallel shafts 110 which are mounted in bearings on cross bars on the frame 7. Each shaft 110 is provided with a bevel gear wheel 111 and the bevel gear wheels 111 co-act with oppositely disposed bevel pinions 112 carried by a driving shaft 113 extending at right angles to the shafts 110 and mounted to rotate in suitable bearings on cross bars on the frame 7.

The driving shaft 113 is provided with two loose pulleys 114 and 115, the pulley 114 being adapted to be driven by a direct belt 116 from a pulley 117 on the shaft 37, and the pulley 115 being adapted to be driven by a cross belt 118 from a pulley on the shaft 37. Thus the two pulleys 114 and 115 may be driven in reverse directions from the shaft 37. These pulleys 114 and 115 are provided with suitable clutch devices 119 and 120, respectively, by means of which either of the pulleys 114 and 115 may be clutched to and unclutched from the shaft 113 independently of each other. The clutch devices 119 and 120 may be of any approved type and they are operated by a centrally disposed grooved collar 121 mounted on the shaft 113. When the clutch collar 121 is in the central position shown in the drawings, the clutch devices 119 and 120 are in the unclutched position and the pulleys 114 and 115 are free to rotate idly upon the shaft 113. When, however, the collar 121 is moved toward the pulley 114, the clutch device 119 is operated to clutch the pulley 114 to the shaft 113 to rotate the shaft in one direction; and when the collar 121 is moved toward the pulley 115 the clutch device 120 is operated to clutch the pulley 115 to the shaft 113 to rotate the shaft in the reverse direction. The grooved collar 121 is engaged by the upper forked end of a hand lever 122 which is fulcrumed on a bracket on the frame 7 whereby the clutch collar 121 may be moved by hand to operate the clutch devices 119 and 120.

From the construction just described it will be seen that when the hand lever 122 is moved to bring the clutch collar 121 to the central position no power will be applied to the shaft 113, and that when the hand lever 122 is moved in one direction to operate the clutch device 119 to clutch the pulley 114 to the shaft 113, the shaft 113 will be turned in one direction; and that when the hand lever 122 is moved in the reverse direction to operate the clutch device 120 to clutch the pulley 115 to the shaft, the shaft 113 will be turned in the reverse direction. The turning of the shaft in the forward and in the reverse direction by the manipulation of the clutch lever 122 will cause the worm shaft 103 to turn in either the forward or the reverse direction through the gear wheels 104 and 105, square shafts 107, gear wheels 108 and 109, shafts 110 and gear wheels 111 and 112 causing the skeins of yarn carried by the rollers 56 and 57 to pass between and around said rollers in either the forward or reverse direction, as described, the direction of the movement of the skeins of yarn and the starting and stopping of the movement thereof being controlled by the operation of the hand lever 122 for a purpose hereinafter described.

The clutch devices for the pulleys 33, 34, 91, 92, 114 and 115 are alike in construction, and I shall therefore describe but one, selecting the clutch device 43 for the pulley 34, and referring to Fig. 15. The pulley 34 rotates loosely upon the shaft 32 and it is provided with a disk 152 adapted to engage a disk 153 projecting from a hub 154 which is fixed to the shaft 32. The disk 152 is adapted to be engaged by a loose ring 155 between which and the disk 153 the disk 152 is arranged. Extending through the disk 153 and the ring 155 are pins 156. These pins also extend through levers 157 which are fulcrumed on a flange projecting from the outer edge of the disk 153 as shown. The pins 156 are provided with heads which engage the ring 155 and the levers 157, whereby when the levers 157 are forced outwardly the disk 153 and the ring 155 will be forced toward each other in a manner to clamp the disk 152 of the pulley 34 therebetween, thus causing the pulley 34 to be locked to the shaft 32 through the disk 153 and its hub 154. The outer ends of the lever 157 are engaged by the outer ends of links 158, the inner ends of which are pivoted to the clutch collar 44 and arranged as shown, whereby when the clutch collar 44 is moved toward the pulley 34 the levers 157 will be forced outwardly in a manner to clutch the pulley 34 to the shaft 32 and when the clutch collar 44 is moved in a direction away from the pulley 34 the pulley will be unclutched from the shaft 32. Clutch devices of the type just described are common and well known.

After the yarn upon the yarn-carrying frame 7 has been subjected to the mercerizing liquid within the tank 3 and the yarn-carrying frame has been raised to the position shown in the drawings, the washing operation is effected by the following mechanism:—Extending along each side of the upper frame and supported thereby is a water supply pipe 123 which is provided with series of depending pipes 124, the lower ends of which terminate in outwardly-extending horizontal pipes 125. The pipes 125 correspond in number with the yarn-carrying rollers 56, and the pipes 125 occupy positions parallel with and directly above the upper yarn-carrying rollers 56 when the yarn-carrying frame is in the raised position shown in the drawings. The bottoms of the pipes 125 are perforated for the discharge of water when the valves 126 of the pipes 123 are open. Thus the water may be discharged upon the yarn carried by the rollers 56 and 57 of the yarn-carrying frame. After the water thus discharged has passed through the yarn, it falls upon the downwardly and outwardly inclined sides of a plate 127, which is secured to the bottom of the bar 15 of the yarn-carrying frame 9. The outwardly extending sides of this plate 127 extend beneath the yarn-carrying rollers 56 and 57, and they are directed toward longitudinally-arranged troughs 128, which are mounted on the upper portions of the side of the tank 3. Between the outer edges of the sides of the plate 127 and the troughs 128 are plates 129, which are secured to the shafts 130 extending outwardly through and mounted in the end walls of the tank 3.

When the yarn-carrying frame 9 is in the raised position shown in the drawings, the inner edges of the plates 129 overlap the outer edges of the plate 127 and abut against the bottom thereof, while the outer edges of the plates 129 extend over the inner walls of the troughs 128 to direct the water falling upon the plates 127 and 129 to the troughs 128. When the plates 129 are in the position shown, the inner portions thereof extend farther from the shafts 130 than the outer portions thereof, and, therefore, in order to counterweight the inner portions of the plates we provide weights 131 which are secured to the lower ends of the chains 132, the upper ends of which extend around and are secured to grooved wheels or pulleys 133, which in turn are secured to the shafts 130.

The shafts 130 are adapted to be turned to move the plates 129 to the full line position shown, and they are also adapted to be turned to move the plates 129 to the dot-and-dash line position shown in Fig. 8; and when the plates 129 are in the full line position, or the dot-and-dash line position they are held therein by the action of weights 134 and their connections, which we shall now describe.

Each weight 134 is caried by one arm 135 of a lever 136, the other arm 137 of which is pivoted to one end of a link 138, each lever 136 being mounted on a suitable pivot stud on the tank 3. The other end of the link 138 is pivoted to the outer end of an arm 139 projecting fixedly from the adjacent shaft 130. The location of these parts with respect to each other and with respect to the plates 129 is such that when the plates 129 are in the full line position shown, the pivotal connections of the link 138 with the arms 137 and 139 are above lines extending between the axes of the shafts 130 and the pivots of the arms 137 with the links 138; and when the plates are in the dot-and-dash line position shown, the pivotal connections of the links 138 with the arms 139 are below lines extending between the axes of the shafts 130 and the pivots of the arms 137 with the links 138. It will therefore be seen that the weights 134 will force the inner edges of the plates 129 up against the outer edges of the plate 127 when the parts are in the full line position; and that the weights 134 will force the lower edges of the plates 129 against the inner side walls of the tank 3 when the parts are in the dot-and-dash line position. It will also be seen that if the yarn-carrying frame 9 be lowered from the position shown in the drawings, the plate 127 will depress the inner edges of the plates 129 until the pivotal connections between the links 138 and arms 139 are moved below lines extending between the axes of the shafts 130 and pivots of the arms 137 with the links 138; whereupon the weights 134 will act to move the lower edges of the plates 129 to and against the inner walls of the tank 3 during the continued downward movement of the yarn-carrying frame 9 and thereby maintain the plates 129 out of the path of the yarn-carrying frame until it has been lowered into the tank 3 and raised therefrom to the position shown; after which the plates 129 are moved simultaneously from the dot-and-dash line position to the full line position by the operation of a single hand-operated part and its connections, which we shall now describe.

Loosely mounted on one shaft 130 is a hand lever 140 provided with an arm 141 having a lateral projection 142 adapted to engage a movable arm 143 projecting fixedly from the shaft 130 carrying the lever 140. The other shaft 130 is provided with an arm 144 which is loosely mounted thereon and provided with a projection 145 adapted to engage an adjacent arm 146 projecting fixedly from the shaft 130 carrying the arm 144. The hand lever 140 is connected to the arm 144 by a rod 147 in a manner to cause the arms 141 and 144 to be turned about the shafts 130 in reverse directions when the hand lever is moved about its shaft 130.

The hand lever 140 rests upon a bracket 148 projecting from the tank 3 and in the position shown in Figs. 9 and 10; and the location of the arms 141 and 144 with relation to the arms 143 and 146 and the plates 129 is such that when the plates 129 are in the dot-and-dash line position and the yarn-carrying frame 9 is in the raised position, the movement of the hand lever 140 in the direction indicated by the arrow in Fig. 10 will cause the projections 142 and 145 of the arms 141 and 144 to engage the arms 143 and 146 and cause them to turn the shafts 130 to move the plates 129 to the full line position shown. Whereupon the hand lever 140 may be returned to the position shown in Fig. 10 without disturbing the position of the plates 129, the projections 142 and 145 leaving the arms 143 and 146.

The yarn-carrying frame 9 is provided with end guard plates 150, which are secured to the inner faces of the end bars 10 and 12 of the yarn-carrying frame, and between which the yarn-carrying rollers 56 and 57 and the water-discharging pipes 125 are arranged, the purpose of the plates 150 being to prevent the water discharged from the pipes 125 from splashing from the ends of the machine and to direct said water to the plates 127 and 129, from which it flows into the troughs 128.

The operation of the machine, briefly described, is as follows:—When the machine is at rest with the parts in the position shown in the drawings, the pulleys 33, 34, 91, 92, 114 and 115 are rotating idly upon their shafts, the pulleys being driven from the outside shaft 37. The skeins of yarn to be mercerized are placed upon the rollers 56 and 57 in a manner to extend between and around the same as is common and well known in machines of this type. After the rollers 56 and 57 have thus been supplied with skeins of yarn, the hand lever 122 is operated to clutch either one of the pulleys 114 or 115 to the shaft 113, thereby causing the rotation of the shaft 113 through the gearing hereinbefore described, causing the rotation of the worm shaft 103 and the upper yarn-supporting rollers 56 geared therewith, as previously explained, the turning of the upper rollers 56 causing the yarn upon the rollers 56 and 57 to travel between and around the same, and this travel of the yarn between and around the rollers continues during the subsequent operations of the machine, wherein the yarn is placed under tension, subjected to the mercerizing liquid, and then washed. The hand lever 99 is now moved to clutch the pulley 91 to the shaft 90, thereby causing the rotation of the pairs of shafts 67 and 68 in a manner to cause their screw-threads 69 to lower the bars 66 and therewith the lower rollers 57 with respect to the upper rollers 56 until the desired tension has been placed upon the skeins of yarn; whereupon the hand lever 99 is moved to unclutch the pulley 91 from the shaft 90 and stop the further downward movement of the bars 66, or the further stretching of the yarn.

After the desired tension has been placed upon the yarn, the hand lever 47 is moved to cause the bar 46 to move the lever 45 and operate the clutch device 42 to clutch the pulley 34 to the shaft 32; whereupon the screw-threaded shafts 20 through the gearing between them and the shafts 32 turn in the direction to cause the lowering of the yarn-carrying frame 9 into the tank 3 containing the mercerizing liquid. During the lowering of the yarn-carrying frame 9, the shafts 67 and 68 slide through the hubs of the gear wheels 61 and the square shafts 107 slide through the gear wheels 105. Just before the yarn-carrying frame 9 reaches a position within the tank 3 wherein the yarn carried by the rollers 56 and 57 is submerged within the mercerizing liquid, the arm 55 of the yarn-carrying frame 9 engages the collar 54 and depresses the rod 51 in a manner to cause the lever 49 and rod 50 to move the lever 45 and therewith the clutch collar 44 to the central position to unclutch the pulley 34 from the shaft 32 and remove the power from the screw-threaded shafts 20. Whereupon the yarn-carrying frame 9 comes to rest upon the projecting arms 25 of the bearings 22, while the slight further movement of the screw-threaded shafts 20 after the power has been removed therefrom causes the blocks 19 to move downward a slight distance with respect to the blocks 17 supporting the yarn-carrying frame 9, as previously described and as shown in Fig. 14. During the initial downward movement of the yarn-carrying frame 9, the outer edges of the water-receiving plate 127 depress the inner edges of the water-receiving plates 129 until the operation of the weights 134 and the parts connected thereto moves the plates 129 out of the path of the yarn-carrying frame 9, as previously described.

After the skeins of yarn have been sufficiently subjected to the action of the mercerizing liquid, the hand lever 47 is moved in a manner to cause the rod 46 to move the lever 45 to operate the clutch device 43 to clutch the pulley 33 to the shaft 32; whereupon the screw-threaded shafts 20 are turned through their connections with the shaft 32 in a manner to cause the raising of the yarn-carrying frame 9. During the raising of the yarn-carrying frame 9 and just before it reaches its uppermost position shown in the drawings, the arm 55 engages the collar 53 of the rod 51, and raises said rod 51 in a manner to cause the lever 49 and link 50 to move the lever 45 and therewith the clutch collar 44 to the central position to unclutch the pulley 33 from the shaft 32, thereby removing the power from the screw-threaded shaft 20 and stopping the further upward movement of the yarn-carrying frame.

After the yarn upon the rollers 56 and 57 has been subjected to the mercerizing liquid and the yarn-carrying frame 9 raised to the position shown, as described, the hand lever 140 is moved from the bracket 148 in the direction indicated by the arrow in Fig. 10 to move the water-receiving plates 129 from the dot-and-dash line position to the full line position shown; whereupon the hand lever 140 is returned to its position upon the bracket 148 for a succeeding operation, as previously explained. This being done, the washing operation takes place by opening the valves 126, thereby discharging water from the pipes 125, which water flows through the yarn while it continues to travel between and around the rollers 56 and 57. The water discharged from the pipes 125 after acting upon the yarn falls upon the plates 127 and 129 over which it flows to the troughs 128. The water passes from the troughs 128 through the outlet openings 151 therein to any suitable receptacle, or any suitable point of discharge. After the yarn has been thoroughly washed to remove the mercerizing liquid therefrom, the valves 126 are closed to stop the flow of water from the pipes 125. The hand lever 99 is now moved to operate the clutch device 97 to clutch the pulley 92 to the shaft 90 thus causing the shaft 90 through the gearing between it and the pairs of shafts 67 and 68 to rotate the pairs of shafts in a manner to cause their screw-threads 69 to raise the bars 66 and therewith the lower rollers 57 to remove the tension from the skeins of yarn. The hand lever 122 is now moved to move the clutch collar 121 to the central position thereby stopping the operation of the shaft 113 and therewith the gearing between it and the upper rollers 56 and perforce stopping the actuation of the yarn upon the rollers 56 and 57. The skeins of yarn may now be removed from the rollers 56 and 57 and other skeins of yarn applied thereto for a succeeding operation.

During the operation of the machine, as just described, the hand lever 122 may be operated to clutch either the pulley 114 or the pulley 115 to the shaft 113 thereby causing the actuation of the skeins of yarn about the rollers 56 and 57 in either a forward or a reverse direction, and the direction of movement of the skeins of yarn may be reversed at any time during the operation of the machine by operating the hand lever 122 and unclutching one of the pulleys 114 and 115 from the shaft 113 and clutching the remaining pulley thereto. After the yarn-carrying frame has been raised after subjecting the yarn carried thereby to the mercerizing liquid, the yarn may be re-stretched, if desired, by operating the hand lever 99, as previously explained.

We claim:—

1. In a mercerizing apparatus, the combination of a tank to contain the mercerizing liquid, a fixed frame, a yarn-carrying frame movable to a position within the tank and to a position outside of the tank, a screw for moving the yarn support, a block engaged with the threads of said screw and engaged with and supporting a part of the yarn-carrying frame, said block being movable with respect to the yarn-carrying frame longitudinally of the screw from a position supporting the yarn-carrying frame, a support for the yarn-carrying frame when it reaches a predetermined position, and means for rotating said screw.

2. In a mercerizing apparatus, the combination of a tank to contain the mercerizing liquid, a fixed frame, a yarn-carrying frame movable to a position within the tank and to a position outside of the tank, a screw for moving the yarn support, a block engaged with the threads of said screw and engaged with and supporting a part of the yarn-carrying frame, said block being movable with respect to the yarn-carrying frame longitudinally of the screw from a position supporting the yarn-carrying frame, a support for the yarn-carrying frame when it reaches a predetermined position, means for rotating said screw, and means for automatically stopping the rotation of said screw.

3. In a mercerizing apparatus, the combination of a tank to contain the mercerizing liquid, a fixed frame, a yarn-carrying frame movable to a position within the tank and to a position outside of the tank, yarn supporting rollers mounted in frames fixed to the yarn-carrying frame, yarn stretching rollers mounted in frames secured to a bar adjustable with respect to the first named rollers, a pair of shafts journaled in the yarn-carrying frame, one shaft having a right-hand screw-thread engaged with said bar and the other shaft having a left-hand screw-thread engaged with said bar, bevel gear wheels on said shafts, a rotatable sleeve, a support for the sleeve, oppositely disposed bevel gear wheels on said sleeve and engaged with the first named wheels, and means for rotating said sleeve.

4. In a mercerizing apparatus, the combination of a tank to contain the mercerizing liquid, a fixed frame, a yarn-carrying frame movable to a position within the tank and to a position outside of the tank, yarn supporting rollers mounted in frames fixed to the yarn-carrying frame, yarn stretching rollers mounted in frames secured to a bar adjustable with respect to the first named rollers, a plurality of pairs of shafts journaled in the yarn-carrying frame one shaft of each pair having a right-hand screw-thread engaged with said bar and the other shaft of each pair having a left-hand screw-thread engaged with said bar, bevel gear wheels on said shafts, a rotatable sleeve for each pair of shafts, supports for said sleeves, oppositely disposed bevel gear wheels on each sleeve, the gear wheels of each sleeve being engaged with the gear wheels of a pair of shafts, a common driving shaft for said sleeves, gearing between said driving shaft and said sleeve, and means operative to turn said driving shaft in forward and reverse directions.

5. In a mercerizing apparatus, the combination of a tank to contain the mercerizing liquid, a fixed frame, a yarn-carrying frame movable to a position within the tank and to a position outside of the tank, yarn supporting rollers mounted in frames fixed to the yarn-carrying frame, yarn stretching rollers mounted in frames secured to a bar adjustable with respect to the first named rollers, an adjusting screw for said bar, and means for turning said screw including a driving part and a driven part operated by the driving part, said driving part being movable into engagement with the driven part when moved in one direction and movable from engagement with the driven part when moved in a reverse direction.

6. In a mercerizing apparatus, the combination of a tank to contain the mercerizing liquid, a fixed frame, a yarn-carrying frame movable to a position within the tank and to a position outside of the tank, yarn supporting rollers mounted in frames fixed to the yarn-carrying frame, yarn stretching rollers mounted in frames secured to a bar adjustable with respect to the first named rollers, and means for adjusting said bar including a shaft, a gear wheel on said shaft, a second shaft, a hub on said second shaft, and a gear wheel movable about the axis of said hub and engaged with the first named gear wheel, said hub and the second named gear wheel being provided with parts positioned to engage each other and cause them to turn together.

7. In a mercerizing apparatus, the combination of a tank to contain the mercerizing liquid, a fixed frame, a water discharge pipe supported above the tank, a yarn support movable to a position within the tank and to a position above the tank and beneath the pipe, and means below the yarn support to direct water discharged from the pipe away from the tank when the yarn support is in the raised position, said means including a water receiving plate adjustable to an operative and to an inoperative position, a pivot shaft for said plate, an arm projecting from said shaft, a weighted lever, and a link connecting said lever to said arm, said lever acting on said arm and holding said plate in the operative position when said arm is in one position and said lever acting on said arm and holding said plate in the inoperative position when said arm is in another position.

8. In a mercerizing apparatus, the combination of a tank to contain the mercerizing liquid, a fixed frame, a water discharge pipe supported above the tank, a yarn support movable to a position within the tank and to a position above the tank and beneath the pipe, and means below the yarn support to direct water discharged from the pipe away from the tank when the yarn support is in the raised position, said means including two water-receiving plates adjustable to an operative and to an inoperative position, means including a weighted lever for each plate for holding said plates in either the operative or inoperative position by the downward pressure of the weighted levers, a hand operated part, and means operated by said part for adjusting said plates.

9. In a mercerizing apparatus, the combination of a tank to contain the mercerizing liquid, a fixed frame, a water discharge pipe supported above the tank, a yarn support movable to a position within the tank and to a position above the tank and beneath the pipe, and means below the yarn support to direct water discharged from the pipe away from the tank when the yarn support is in the raised position, said means including two water-receiving plates adjustable to an operative and to an inoperative position, means for holding said plates in either the operative or inoperative position, a pivot shaft for each plate, an arm fixed to one pivot shaft, an arm fixed to the other pivot shaft, an arm loose on one pivot shaft, a hand lever loose on the other pivot shaft, and a bar connecting said lever with said loose arm, said loose arm and said lever being positioned to engage said fixed arms and turn said pivot shafts and adjust said plates to the operative position when said lever is moved by hand and to permit said plates to be adjusted to the inoperative position independently of said lever.

In testimony whereof we affix our signatures in presence of two witnesses.

GEORGE E. DRUM.
JAMES H. SKITT.

Witnesses:
A. V. GROUPE,
S. I. HARPER.